June 20, 1939.　　　　H. F. SMITH　　　　2,163,569
STEERING WHEEL HUB STRUCTURE
Filed Sept. 11, 1937
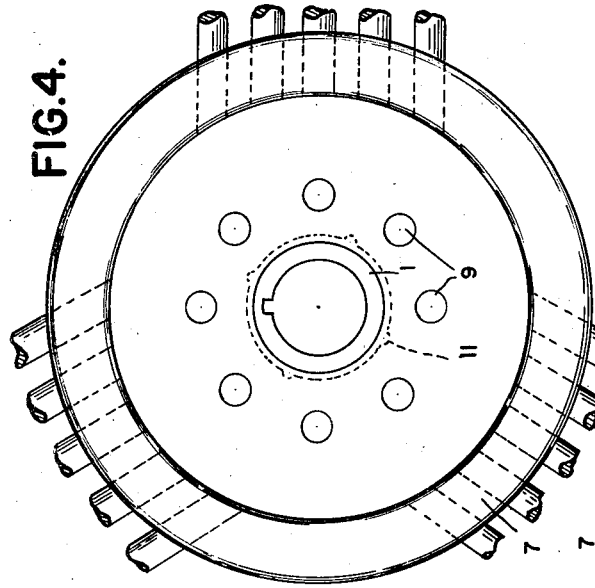
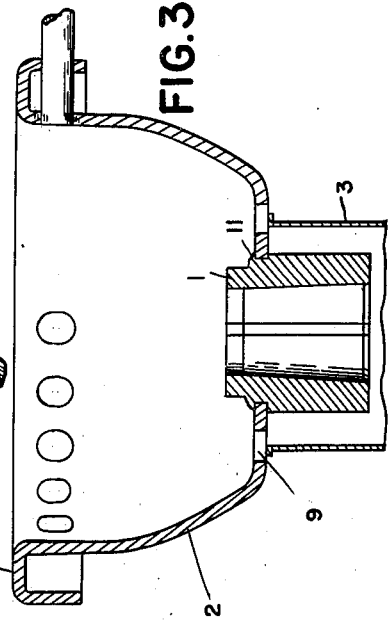
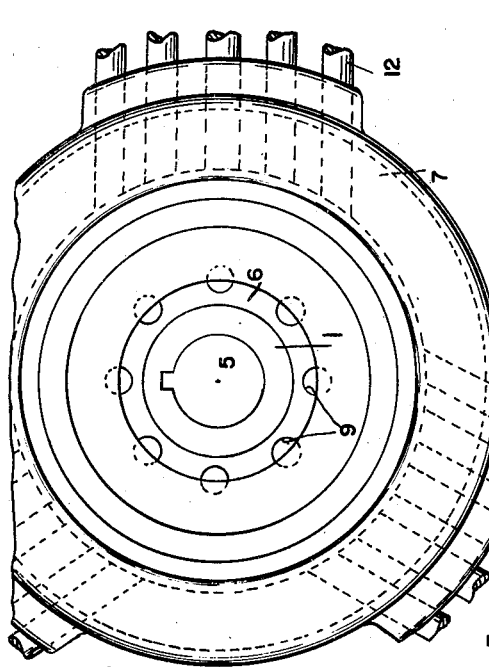
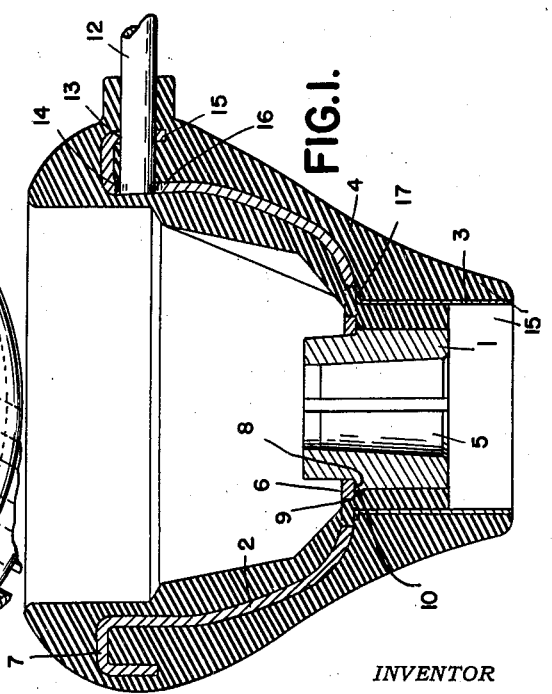
INVENTOR
HARRY F. SMITH
BY
*Whittemore, Hulbert & Belknap*
ATTORNEYS Patented June 20, 1939

2,163,569

UNITED STATES PATENT OFFICE 2,163,569

STEERING WHEEL HUB STRUCTURE

Harry F. Smith, Toledo, Ohio, assignor to The Acklin Stamping Company, Toledo, Ohio, a corporation of Ohio Application September 11, 1937, Serial No. 163,464

11 Claims. (Cl. 74—552)

This invention relates generally to vehicle steering wheels and refers more particularly to the hub structure thereof and to the connections between the hub and the spokes or other suitable supporting elements for the rim of the wheel.

One of the essential objects of the invention is to provide an improved steering wheel hub structure of the built-up type wherein metallic parts constituting anchorage means for the spokes of the wheel are imbedded in rubber or rubber composition.

Another object of the invention is to provide an improved means for anchoring the spokes of the wheel in the hub structure.

Another object is to provide a strong and durable hub structure that is neat in appearance, comparatively light in weight, simple in construction, and economical to manufacture.

Other objects, advantages and novel details of construction of this invention will be made more apparent as this description proceeds, especially when considered in connection with the accompanying drawing, wherein:

Figure 1 is a vertical section view through a hub structure embodying my invention and showing the spokes of the wheel applied thereto;

Figure 2 is a top plan view of the structure illustrated in Figure 1;

Figure 3 is a view of a slight modification without the rubber;

Figure 4 is a top plan view of the structure illustrated in Figure 3.

Referring now to the drawing, 1 is the central hub member, 2 is the cup, 3 is the sleeve, and 4 is the casing of the hub structure embodying my invention. As shown, the hub member 1 is a screw machine part and has the usual tapered bore 5 for the steering stem (not shown). The cup 2 is pressed from sheet metal and has a substantially flat base 6 and an inverted channel-shaped portion 7 at its upper open end. The base 6 is non-rotatably sleeved upon a shoulder 8 of the hub member and is provided adjacent thereto with a series of circular holes 9. If desired, the base 6 of the cup may be brazed or welded at 10 to the central hub member 1, as illustrated in Figure 1, or in addition thereto may be fastened by portions 11 of the hub member 1 (Figure 3) that are clinched upon said base.

The spokes 12 of the wheel extend through aligned openings 13 and 14 respectively in the sides 15 and 16 of the channel-shaped portion 7 and are preferably welded to the inner faces of said sides 16. The sleeve 3 is substantially concentric with the hub member 1 and projects below the same to provide a socket 15' for the head (not shown) of the steering column. Preferably the upper end of this sleeve 3 is adjacent the base 6 of the cup and is provided with a lateral flange 17.

As shown in Figure 1, all of the parts just described, namely, the hub member 1, cup 2, sleeve 3, and the inner ends of the spokes 12, are imbedded in rubber or rubber composition forming the casing 4 of the hub structure.

In the process of construction the spokes 12 are assembled with the channel portion 7 of the cup after the latter has been mounted on the shoulder 8 of the hub member 1. However, it is apparent that the spokes 12 may be secured to the channel portion 7 of the cup before the latter is mounted on the hub. After the spokes 12, cup 2 and hub member 1 have been assembled, the latter is placed inside the sleeve 3 within a suitable mold (not shown) and rubber or rubber composition is then poured in said mold to form the finished hub structure. In this connection it will be noted that the rubber will flow through the openings 9, between the hub member 1 and sleeve 3, and upon the outer sides of the latter, as well as upon both sides of the cup 2, and around the connections between the spokes 12 and channel portion 7 of the cup. Thus, the rubber effectively conceals the joints between the spokes 12 and cup, as well as the joints between the latter and hub member 1 and provides a neat appearance for the hub structure.

What I claim as my invention is:

1. In a steering wheel, a plurality of spokes, and a supporting hub structure for said spokes having a cup-shaped member provided at its open end with an inverted channel-shaped portion, the sides of said channel-shaped portion having openings receiving portions of said spokes, means securing said spoke portions to said channel-shaped portion, and means formed from plastic material covering said cup-shaped member and said spoke securing means.

2. In a steering wheel, a hub structure having a screw machine part provided with an opening for a steering stem and having a reduced upper end providing an annular shoulder, a pressed metal cup having its base non-rotatably sleeved upon the reduced end of said machine part and engaging said shoulder and having an inverted substantially channel-shaped portion at its open upper end, and spokes engaging aligned holes in the side walls of said channel-shaped portion and rigid with one of said walls.

3. In a steering wheel, a hub structure having a member provided with an opening for a steering stem, a pressed metal cup having its base non-rotatably sleeved upon said member and having an inverted substantially channel-shaped portion, and spokes engaging holes in the side walls of said channel-shaped portion and held against displacement therefrom.

4. In a steering wheel, a hub structure having a member provided with an opening for a steering stem, a pressed metal cup having its base non-rotatably sleeved upon said member and having an inverted substantially channel-shaped portion, spokes engaging holes in the side walls of said channel-shaped portion, a connection between said spokes and one wall of said channel-shaped portion, and means formed from plastic material substantially covering said cup and the connection between said spokes and channel-shaped portion aforesaid.

5. In a steering wheel, a hub structure having a screw machine part provided with an opening for a steering stem and having a reduced upper end providing an annular shoulder, a pressed metal cup having its base non-rotatably sleeved upon the reduced end of said machine part and engaging said shoulder and having an inverted substantially channel-shaped portion, spokes engaging holes in the side walls of said channel-shaped portion, a connection between said spokes and one wall of said channel-shaped portion, and means formed from plastic material substantially covering said cup and the connection between said spokes and channel-shaped portion.

6. In a steering wheel, a plurality of spokes, and a supporting hub structure for said spokes having a cup-shaped member provided at its open end with an inverted channel-shaped portion, the sides of said channel-shaped portion having openings receiving portions of said spokes, and means securing said spoke portions to said channel-shaped portion.

7. In a steering wheel, a hub structure having a screw machine part provided with an opening for a steering stem and having a reduced upper end providing an annular shoulder, a pressed metal cup having its base non-rotatably sleeved upon the reduced end of said machine part and engaging said shoulder, a sleeve spaced from and concentric with said machine part, said sleeve being provided adjacent the base of the cup with a lateral flange and projecting below the lower end of said machine part and cooperating therewith to form a socket for the head of a steering column, the base of said cup being provided substantially in vertical alignment with said flange with an opening, and means formed from plastic material upon opposite sides of said cup, in said openings, between the machine part and sleeve, and upon the outer side of the latter.

8. In a steering wheel, a hub structure having a member provided with an opening for a steering stem, a pressed metal cup having its base non-rotatably sleeved upon said member, a sleeve spaced from and substantially concentric with said member, said sleeve being provided adjacent the base of the cup with a lateral flange and projecting below the lower end of said member and cooperating therewith to form a socket for a head of a steering column, the base of said cup being provided substantially in vertical alignment with said flange with openings, and means formed from plastic material upon opposite sides of said cup, in said openings, between the member and sleeve and upon the outer side of the latter.

9. In a steering wheel, a hub structure having a member provided with an opening for a steering stem, a substantially cup-shaped member having its base anchored upon said member and having an inverted substantially channel-shaped portion, radially extending spokes engaging holes in the side walls of said channel-shaped portion, and means connecting said spokes to one wall of said channel-shaped portion.

10. In a steering wheel, a hub structure having a member provided with an opening for a steering stem, a substantially cup-shaped member having its base anchored upon the member aforesaid and provided above the base with means for supporting radially extending spokes, a sleeve spaced from and substantially concentric with said first mentioned member, said sleeve being provided adjacent the base of the second mentioned member with a lateral flange, said sleeve projecting below the lower end of the first mentioned member and cooperating therewith to form a socket for a head of a steering column, and means formed from plastic material upon opposite sides of the base of the second mentioned member, between the first mentioned member and sleeve and upon the outer side of the latter.

11. In a steering wheel, a hub structure having a member provided with an opening for a steering stem, a spoke supporting member anchored upon the member aforesaid, a sleeve spaced from and substantially concentric with the first mentioned member, the upper end of said sleeve being adjacent the second mentioned member, said sleeve projecting below the lower end of the first mentioned member and cooperating therewith to form a socket for a head of a steering column, and means formed from plastic material upon the underside of the second mentioned member and between the first mentioned member and sleeve, the portion of said means between the first mentioned member and sleeve cooperating with said first member and sleeve to complete the socket aforesaid for a head of a steering column.

HARRY F. SMITH.